Patented June 16, 1925.

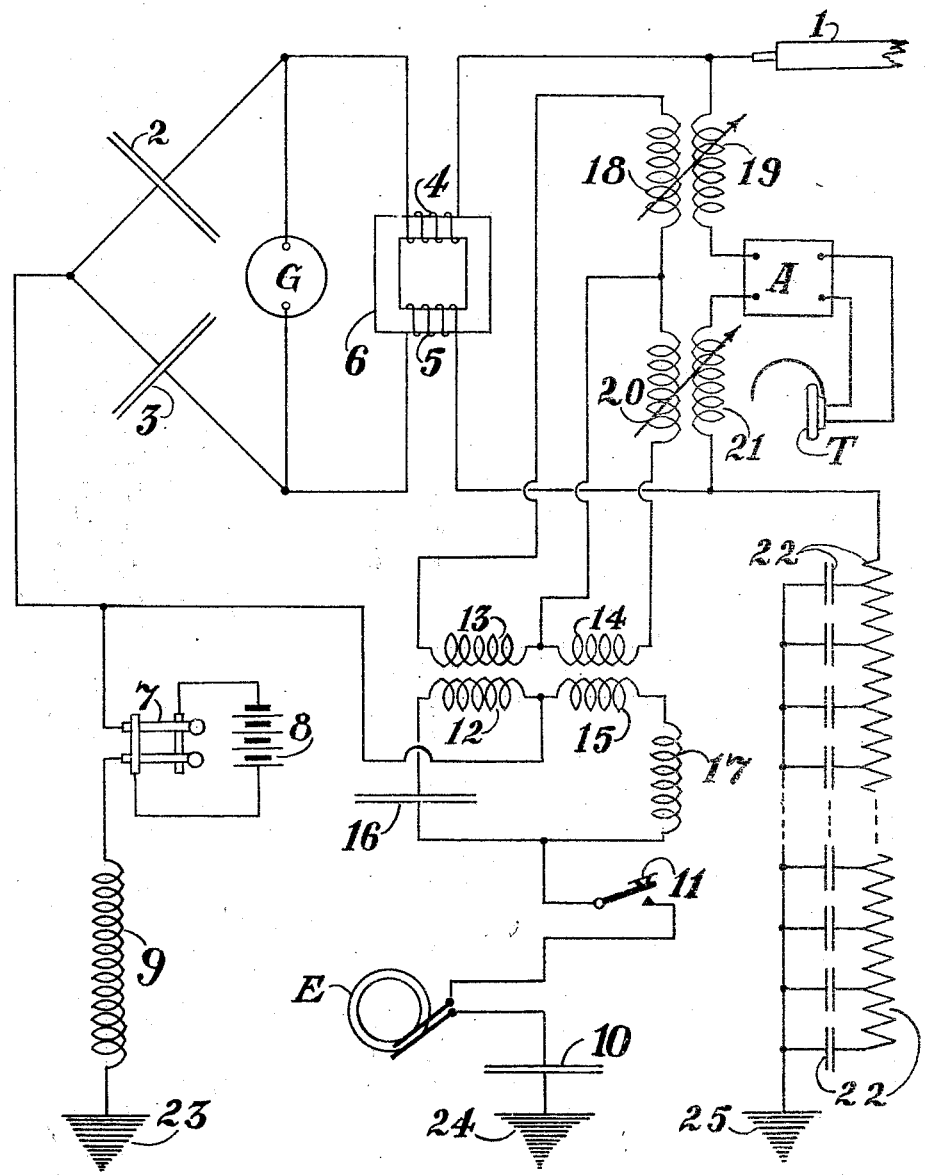

1,542,524

UNITED STATES PATENT OFFICE.

LESTER J. RICH, OF WASHINGTON, DISTRICT OF COLUMBIA.

APPARATUS FOR THE ELECTRICAL TRANSMISSION OF INTELLIGENCE.

Application filed January 26, 1921. Serial No. 440,179.

*To all whom it may concern:*

Be it known that I, LESTER J. RICH, a citizen of the United States of America, residing at Washington, in the District of Columbia, have invented a certain new Improvement in Apparatus for the Electrical Transmission of Intelligence, of which the following is a specification.

This invention relates to improvements in apparatus for the electrical transmission of intelligence, having for an object to provide apparatus for the duplex operation of submarine cables by means of alternating currents and the simultaneous duplex operation of said cables by means of direct currents; the direct current apparatus and the alternating current apparatus being so interconnected with auxiliary parts that neither interferes with the other.

In order that the invention and its mode of application may be readily understood by persons skilled in the art, I have in the accompanying illustrative drawings and in the detailed following description based thereon, set out a possible embodiment of the same.

In these drawings there is shown a diagrammatic view representing an arrangement of apparatus at one end of a submarine cable; by means of these apparatus and a substantially similar set of apparatus at the other end of the cable, direct current signals and alternating current signals may be sent simultaneously and in both directions, making a total of four messages simultaneously handled over the cable.

Having more particular reference to the drawings in connection with which like characters of reference will designate corresponding parts throughout, the numeral 1 indicates one end of the cable, the other end of which is located at a distant station. To this end there is connected the direct current signal apparatus consisting of a cable key 7 and a battery 8. For the purpose of duplex operation, an artificial line 22 is connected as part of the terminal apparatus, having earth connection at 25. Earth connection for the cable key 7 is effected at 23 through the self inductance 9. Condensers 2 and 3 form two arms of the duplex bridge, the cable 1 and the artificial line 22 forming the remaining two sides, and the galvanometer G (together with its accessory apparatus, not shown in the drawing) is connected in the bridging arm as shown. These parts constitute the direct current sending and receiving devices and their arrangement and manner of operation is much the same as at present practiced in the art.

For the production of alternating current signals, a source of alternating current of an appropriate frequency is provided, being indicated in the diagram at E, and having connection to earth at 24 through the condenser 10. For reception of alternating current signals, an amplifier A is provided, having a degree of amplification appropriate to the strength of the received signal. The signals are finally made intelligible at the telephone T or, if they are below audible frequency, by some device sensitive to alternating currents of that frequency substituted in place of such telephone T. As necessary auxiliary apparatus, there is provided an iron core 6 having two windings, 4 and 5, which are placed on the core in such a manner that currents from the battery 8 or the oscillator E flow in opposite directions around the core in the two windings 4 and 5.

As further auxiliary apparatus, there is provided a condenser 16 and an inductance 17 arranged so that current from the oscilator E flows partly through the condenser and partly through the inductance. The current which flows through the inductance 17 flows also thru the primary winding 15 of an air-core transformer, the secondary winding of which is designated by the numeral 14; and the current which flows thru the condenser 16 flows also through the primary winding of another air-core, the transformer, the secondary winding of which is designated by the numeral 13. The windings 13 and 14 have connection with the windings 18 and 20 in a manner indicated in the diagram; and the windings 18 and 20 are magnetically coupled to the windings 19 and 21 respectively, the couplings between the windings 18 and 19 and between the windings 20 and 21 being made very loose, whereby the mutual inductance between the same is made small in comparison with the self inductance, and the degree of coupling is, in each case, adjustable.

The manner in which the apparatus performs its function is as follows:

Direct current signal or messages are formed by manipulation of the key 7, power being supplied by the battery 8. No appreciable portion of this power can be lost through the ground connection 24 because of the condenser 10 in series therewith.

The signals formed at the key 7 will not be perceptible at the galvanometer G if the condensers 2 and 3 are alike and if the artificial cable 22 reproduces with sufficient accuracy the electrical properties of the actual cable 1. The windings 4 and 5 will offer practically no impedance to the currents forming these signals, because being in opposite directions around the core 6, they will neutralize one another. Signals formed by the key 7 will not be perceptible in the telephone T for the same reason that they are not perceptible at the galvanometer G; and for the additional reason, that the amplifier A and the telephone T are not well adapted to handling direct currents. The signals formed at the key 7 thus pass to the cable 1 and through the same to its distant end without disturbing the galvanometer G or the telephone T.

Direct current signals originating at the distant end of the cable pass through the galvanometer G where they are made intelligible, but do not cause any appreciable disturbance in the telephone T, because currents of such flow variations are not of a character to produce an audible sound in a telephone, nor are they effectively amplified by the amplifier A.

Alternating current signals or messages constituted by currents of a certain frequency are formed by manipulation of the key 11, power being supplied by the oscillator E. No appreciable portion of the power from the oscillator E can be lost through the ground connection 23 on account of the inductance 9 in series with such ground connection. Signals formed at the key 11 will not cause any disturbance at the galvanometer G inasmuch as this galvanometer is connected in the bridging arm of a duplex bridge, the two halves of which have similar electrical properties, and also because the galvanometer is not adapted to respond to such rapidly varying currents as are generated at the oscillator E. As it is a matter of great difficulty to balance the duplex bridge for both direct current manipulation and alternating currents of the frequency supplied by the generator E, it is particularly the latter reason which accounts for the galvanometer G not responding to current generated at E. The coils 4 and 5 will offer practically no impedance to the currents forming the signals originating at the key 11, inasmuch as the current in 4 flows around the core 6 in a direction opposite to the flow of current in 5; hence, the coils 4 and 5 merely neutralize each other. Alternating current signals formed at the key 11 will not be audible in the telephone receiver T, since the telephone receiver and its amplifier A are in the bridging arm of a duplex bridge, the two halves of which have similar electrical properties. However, this is not ordinarily sufficient to entirely eliminate sound in the telephone because of practical difficulties encountered in balancing the duplex bridge for both direct current manipulation and alternating current of a comparatively high frequency; the duplex bridge only reduces the noise in T originating from the oscillator E and the key 11 to a small amount. In order to eliminate the noise which remains in the telephone T after the bridge has been balanced as well as possible, a small amount of power is taken from the oscillator E by means of the coils 13 and 14, such coils being inductively coupled to the coils 12 and 15 respectively, and some of this power is fed into the amplifier by means of the variable mutual inductance between coils 18 and 19 and also, by means of the variable mutual inductance between coils 20 and 21. Since coil 12 has in series with it a condenser 16, and the coil 15 has in series with it an inductance 17, the voltages induced in 13 and 14 are of different phase, and in consequence the voltages induced at 19 and 21 are different in phase. By adjustment of the variable mutual inductance between coils 18 and 19 and between the coils 20 and 21, the power supplied to the input terminals of the amplifier A may be made to just neutralize whatever noise remains in the telephone T on account of imperfect balance of the duplex bridge. The signals formed at the key 11, thus pass into the cable and through the same to the distant end without disturbing either the galvanometer G or the telephone T.

Alternate current signals originating at the distant end of the cable are received in the telephone T after amplification a sufficient amount by the amplifier A. In order to prevent a large portion of the power of the incoming signals from being lost by passing through the galvanometer G and the condensers 2 and 3, the windings 4 and 5 are provided on the iron core 6. Incoming signals flow in these windings in the same direction around the core 6, so that the windings 4 and 5 present a high impedance to these currents and prevent an appreciable portion of them from passing through the galvanometer G or the condensers 2 and 3.

Since none of the operations described above interfere with any other of the operations, they may all be carried on simultaneously. Hence, when a set of apparatus such as illustrated in the diagram and hereinbefore described, is used to its full capacity, one alternating current message and one direct current message may be transmitted and received in each direction, making a total of four messages simultaneously handled over the cable.

The particular features of the invention herein presented by this invention may be reviewed in brief as follows: First, the manner of using the coils 4 and 5 for directing the flow of current composing the incoming signal, and the manner in which they are arranged so as not to interfere with outgoing signals; second, the method of compensating for whatever unbalance there may be in the artificial line, by taking a small amount of power from the oscillator and using it to neutralize the current due to this unbalance; and third, the combination of an artificial line which does not quite faithfully reproduce the electrical properties of the actual cable and the device described herein for neutralizing the unbalance by the use of a small amount of power taken from the oscillator.

I claim:

1. In combination with a duplex alternating and direct current signalling apparatus including a cable and an artificial line, an inductance coil connected to the cable, an inductance coil connected to the artificial line, a receiving apparatus connected between said cable and line, said inductance coils being electromagnetically coupled to offer a high impedance to the currents of incoming alternating current signals, so that the major portion of such currents pass through the receiving apparatus but said coils neutralizing each other for outgoing alternating current signals to offer a low impedance for such signals.

2. In combination with a duplex alternating and direct current signalling apparatus including a cable and an artificial line, said cable and artificial line forming two sides of a duplex bridge, two impedances forming the other two sides of said bridge, a bridging circuit for said bridge including a device for receiving direct current signals, a receiving apparatus for alternating current signals connected between the line and cable, a transmitter for direct current signals connected to the point of connection of said bridge impedances, and a transmitter for alternating current signals connected to said last mentioned point.

3. The device as claimed in claim 2, in which two electromagnetically coupled coils form a part of the duplex bridge one coil forming a part of the cable arm of said bridge and the other coil forming a part of the artificial line side of the bridge, said coils being wound to neutralize each other's impedance for outgoing signals, but offering a high impedance to incoming alternating current signals.

4. In combination with a duplex alternating and direct current signalling apparatus including a cable and an artificial line, said cable and artificial line forming two sides of a duplex bridge, two impedances forming the other two sides of said bridge, a bridging circuit for said bridge including a device for receiving direct current signals, a receiving apparatus for alternating current signals including an amplifier connected between the line and cable, a transmitter for direct current signals connected to the point of connection of said bridge impedances, a transmitter for alternating current signals connected to said last mentioned point, two electromagnetically coupled coils form a part of the duplex bridge one coil forming a part of the cable arm of said bridge and the other coil forming a part of the artificial line side of the bridge, said coils being wound to neutralize each other's impedance for outgoing signals, but offering a high impedance to incoming alternating current signals, and means for adjusting the power supplied to the input terminals of said amplifier to compensate for imperfect balance of the duplex bridge.

LESTER J. RICH.